(12) United States Patent
Kohler et al.

(10) Patent No.: US 10,458,687 B2
(45) Date of Patent: Oct. 29, 2019

(54) VAPOR COMPRESSION SYSTEM (71) Applicant: Johnson Controls Technology Company, Plymouth, MI (US)

(72) Inventors: Jay A. Kohler, York, PA (US); Patrick Christian Marks, York, PA (US); Ian Michael Casper, York, PA (US); Kurt Devlin, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/399,602

(22) Filed: Jan. 5, 2017

(65) Prior Publication Data

US 2017/0191714 A1    Jul. 6, 2017

Related U.S. Application Data (60) Provisional application No. 62/275,522, filed on Jan. 6, 2016.

(51) Int. Cl.
*F25B 39/02* (2006.01)
*F25B 43/00* (2006.01)
(Continued)

(52) U.S. Cl.
CPC ............ *F25B 43/006* (2013.01); *F25B 39/02* (2013.01); *F25B 39/028* (2013.01);
(Continued)

(58) Field of Classification Search
CPC ...... F25B 39/00; F25B 43/006; F25B 41/062; F25B 39/02; F25B 39/028; F25B 40/02;
(Continued)

(56) References Cited

U.S. PATENT DOCUMENTS 3,096,630 A * 7/1963 Weller ...................... F25B 1/00
62/506
3,191,396 A    6/1965 Ruddock
(Continued)

FOREIGN PATENT DOCUMENTS

DE          2336151 A1    2/1974
DE    102008016627 A1   10/2009
(Continued)

OTHER PUBLICATIONS

PCT International Search Report and Written Opinion for PCT Application No. PCT/US2017/012557 dated Apr. 5, 2017, 17 pgs.
(Continued)

*Primary Examiner* — Joseph F Trpisovsky
(74) *Attorney, Agent, or Firm* — Fletcher Yoder, P.C.

(57) ABSTRACT

Embodiments of the present disclosure relate to a heating, ventilation, air conditioning, and refrigeration (HVAC&R) system that includes a refrigerant loop, a compressor disposed along the refrigerant loop and configured to circulate refrigerant through the refrigerant loop, and an evaporator disposed along the refrigerant loop and configured to place the refrigerant in thermal communication with a cooling fluid, where the refrigerant surrounds a tube bundle disposed in the evaporator, the tube bundle is configured to flow the cooling fluid, and the evaporator has a height based at least on a target height of a liquid level of refrigerant in the evaporator, the evaporator includes a discharge configured to direct the vapor refrigerant from the evaporator to an inlet of the compressor, and an interface between the discharge and the inlet is without a bend.

20 Claims, 6 Drawing Sheets

(51) Int. Cl.

| | | |
|---|---|---|
| *F25B 41/06* | (2006.01) | |
| *F28F 9/00* | (2006.01) | |
| F25B 40/02 | (2006.01) | |
| F28D 7/16 | (2006.01) | |
| F28D 21/00 | (2006.01) | |
| F25B 25/00 | (2006.01) | |
| F28F 19/00 | (2006.01) | |

(52) U.S. Cl.
CPC ............ *F25B 41/062* (2013.01); *F28F 9/005* (2013.01); *F25B 25/005* (2013.01); *F25B 40/02* (2013.01); *F25B 2339/0242* (2013.01); *F25B 2339/047* (2013.01); *F25B 2341/0661* (2013.01); *F25B 2341/0662* (2013.01); *F25B 2400/13* (2013.01); *F25B 2400/23* (2013.01); *F25B 2500/01* (2013.01); *F25B 2600/0253* (2013.01); *F25B 2600/2513* (2013.01); *F25B 2700/171* (2013.01); *F25B 2700/21162* (2013.01); *F25B 2700/21163* (2013.01); *F28D 7/16* (2013.01); *F28D 2021/0063* (2013.01); *F28D 2021/0071* (2013.01); *F28F 19/002* (2013.01); *Y02B 30/741* (2013.01)

(58) Field of Classification Search
CPC .......... F25B 2339/0242; F25B 2400/13; F25B 2339/047; F25B 2700/21162; F25B 2600/2513; F25B 2341/0661; F25B 2700/21163; F25B 2341/0662; F25B 2700/171; F25B 25/005; F25B 2400/23; F25B 2500/01; F25B 2600/0253; F25B 2400/12; F28D 7/16; F28D 2021/0071; F28D 2021/0063; Y02B 30/741
USPC .................................................. 62/468, 518
See application file for complete search history.

(56) References Cited

U.S. PATENT DOCUMENTS

| | | | | |
|---|---|---|---|---|
| 5,542,261 | A * | 8/1996 | Albertson | F25B 1/053 62/149 |
| 6,293,112 | B1 * | 9/2001 | Moeykens | F25B 39/02 165/115 |
| 6,434,960 | B1 * | 8/2002 | Rousseau | F25B 1/047 62/228.4 |
| 7,975,506 | B2 * | 7/2011 | James | F25B 43/00 62/332 |
| 8,359,882 | B2 * | 1/2013 | Al-Eidan | F25B 40/00 62/112 |
| 2006/0080998 | A1 | 4/2006 | De Larminat et al. | |
| 2009/0178790 | A1 * | 7/2009 | Schreiber | F25B 39/028 165/158 |
| 2010/0139898 | A1 | 6/2010 | Hung et al. | |
| 2011/0005270 | A1 * | 1/2011 | Yoshimi | F25B 1/10 62/510 |
| 2011/0017432 | A1 | 1/2011 | Kulankara et al. | |
| 2011/0048046 | A1 * | 3/2011 | Sommer | F04D 17/12 62/228.1 |
| 2011/0056664 | A1 | 3/2011 | De Larminat et al. | |
| 2012/0034114 | A1 * | 2/2012 | Lee | F04B 35/045 417/417 |
| 2012/0042674 | A1 * | 2/2012 | Takenaka | F24F 3/06 62/180 |
| 2013/0047630 | A1 * | 2/2013 | Lu | F25B 21/02 62/3.6 |
| 2013/0086937 | A1 | 4/2013 | Albertson et al. | |
| 2014/0102665 | A1 * | 4/2014 | Sibik | F25B 49/02 165/11.1 |
| 2014/0121842 | A1 * | 5/2014 | Nodson | F24F 11/006 700/276 |
| 2015/0013950 | A1 | 1/2015 | Numata et al. | |
| 2015/0040594 | A1 * | 2/2015 | Suzuki | B60H 1/00899 62/159 |
| 2015/0168041 | A1 | 6/2015 | Havard, Jr. et al. | |
| 2015/0360972 | A1 * | 12/2015 | Reuveni | B01D 1/04 202/174 |

FOREIGN PATENT DOCUMENTS

| | | |
|---|---|---|
| EP | 1477748 A1 | 11/2004 |
| EP | 1988345 A1 | 11/2008 |
| EP | 2589899 A1 | 5/2013 |
| WO | 9857104 A1 | 12/1998 |
| WO | 0144730 A1 | 6/2001 |
| WO | 2009004422 A2 | 1/2009 |
| WO | 2013144441 A1 | 10/2013 |
| WO | 2014179576 A2 | 11/2014 |
| WO | 2014197538 A1 | 12/2014 |
| WO | 2016057492 A1 | 4/2016 |

OTHER PUBLICATIONS

PCT International Search Report and Written Opinion for PCT Application No. PCT/US2017/012560 dated Apr. 6, 2017, 16 pgs.
PCT International Search Report and Written Opinion for PCT Application No. PCT/US2017/012575 dated Mar. 31, 2017, 17 pgs.
PCT International Search Report and Written Opinion for PCT Application No. PCT/US2017/012582 dated Mar. 30, 2017, 17 pgs.

* cited by examiner

VAPOR COMPRESSION SYSTEM

CROSS REFERENCE TO RELATED APPLICATIONS

This application claims priority from and the benefit of U.S. Provisional Application Ser. No. 62/275,522, filed Jan. 6, 2016, entitled "VAPOR COMPRESSION SYSTEM," the disclosure of which is hereby incorporated by reference in its entirety for all purposes.

BACKGROUND

This application relates generally to vapor compression systems incorporated in air conditioning and refrigeration applications.

Vapor compression systems utilize a working fluid, typically referred to as a refrigerant that changes phases between vapor, liquid, and combinations thereof in response to being subjected to different temperatures and pressures associated with operation of the vapor compression system. Refrigerants are desired that are friendly to the environment, yet have a coefficient of performance (COP) that is comparable to traditional refrigerants. COP is a ratio of heating or cooling provided to electrical energy consumed, and higher COPs equate to lower operating costs. Unfortunately, there are challenges associated with designing vapor compression system components compatible with environmentally-friendly refrigerants, and more specifically, vapor compression system components that operate to maximize efficiency using such refrigerants.

SUMMARY

In an embodiment of the present disclosure, a heating, ventilation, air conditioning, and refrigeration (HVAC&R) system includes a refrigerant loop, a compressor disposed along the refrigerant loop and configured to circulate refrigerant through the refrigerant loop, and an evaporator disposed along the refrigerant loop and configured to place the refrigerant in thermal communication with a cooling fluid, where the refrigerant surrounds a tube bundle disposed in the evaporator, the tube bundle is configured to flow the cooling fluid, and the evaporator has a height based at least on a target height of a liquid level of refrigerant in the evaporator, the evaporator includes a discharge configured to direct the vapor refrigerant from the evaporator to an inlet of the compressor, and an interface between the discharge and the inlet is without a bend.

In another embodiment of the present disclosure, a heating, ventilation, air conditioning, and refrigeration (HVAC&R) system includes a refrigerant loop, a compressor disposed along the refrigerant loop and configured to circulate refrigerant through the refrigerant loop, and an evaporator disposed along the refrigerant loop and configured to place the refrigerant in thermal communication with a cooling fluid to evaporate the refrigerant into vapor refrigerant, where the evaporator has a discharge configured to direct the vapor refrigerant from the evaporator to an inlet of the compressor, and where a first central axis of the discharge and a second central axis of the inlet are axially aligned such that the vapor refrigerant travels in substantially one direction from the evaporator to the compressor.

In still another embodiment of the present disclosure, a heating, ventilation, air conditioning, and refrigeration (HVAC&R) system includes a refrigerant loop, a compressor disposed along the refrigerant loop and configured to circulate refrigerant through the refrigerant loop, and an evaporator disposed along the refrigerant loop and configured to place the refrigerant in thermal communication with a cooling fluid to evaporate the refrigerant to a vapor refrigerant, where the refrigerant surrounds a tube bundle disposed in the evaporator, the tube bundle is configured to flow the cooling fluid, the evaporator has a height based at least on a target height of a liquid level of refrigerant in the evaporator, the evaporator has a discharge configured to direct the vapor refrigerant from the evaporator to an inlet of the compressor, and the discharge and the inlet are coaxially aligned such that the vapor refrigerant travels in a substantially vertical direction from the evaporator to the compressor.

DETAILED DESCRIPTION

Embodiments of the present disclosure are directed to a closed refrigerant loop that may reduce a pressure head of liquid refrigerant surrounding a tube bundle in an evaporator of the closed refrigerant loop. Reducing the pressure head of the liquid refrigerant may also result in a reduced size of the closed refrigerant loop. Further, the closed refrigerant loop may be arranged such that vapor refrigerant from the evaporator travels into a compressor of the closed refrigerant loop in substantially one direction (e.g., more than 90% of the vapor refrigerant flows in a single, vertical direction, more than 95% of the vapor refrigerant flows in a single, vertical direction, more than 98% of the vapor refrigerant flows in a single, vertical direction, or more than 99% of the vapor refrigerant flows in a single, vertical direction), such that a discharge of the evaporator and an inlet of the compressor are axially aligned. Accordingly, the compressor may be positioned substantially vertically above a discharge of the evaporator so that the vapor refrigerant may not change directions when flowing from the evaporator to the compressor. Such an arrangement may reduce a pressure loss experienced by the vapor refrigerant as well as further reduce a size of the closed refrigerant loop. Reducing the pressure head of liquid refrigerant in the evaporator and reducing the pressure loss of the vapor refrigerant between the evaporator and the compressor may ultimately lead to an enhanced efficiency of the closed refrigerant loop and enable the closed refrigerant loop to utilize a low pressure refrigerant (e.g., R-123).

Figure 1:
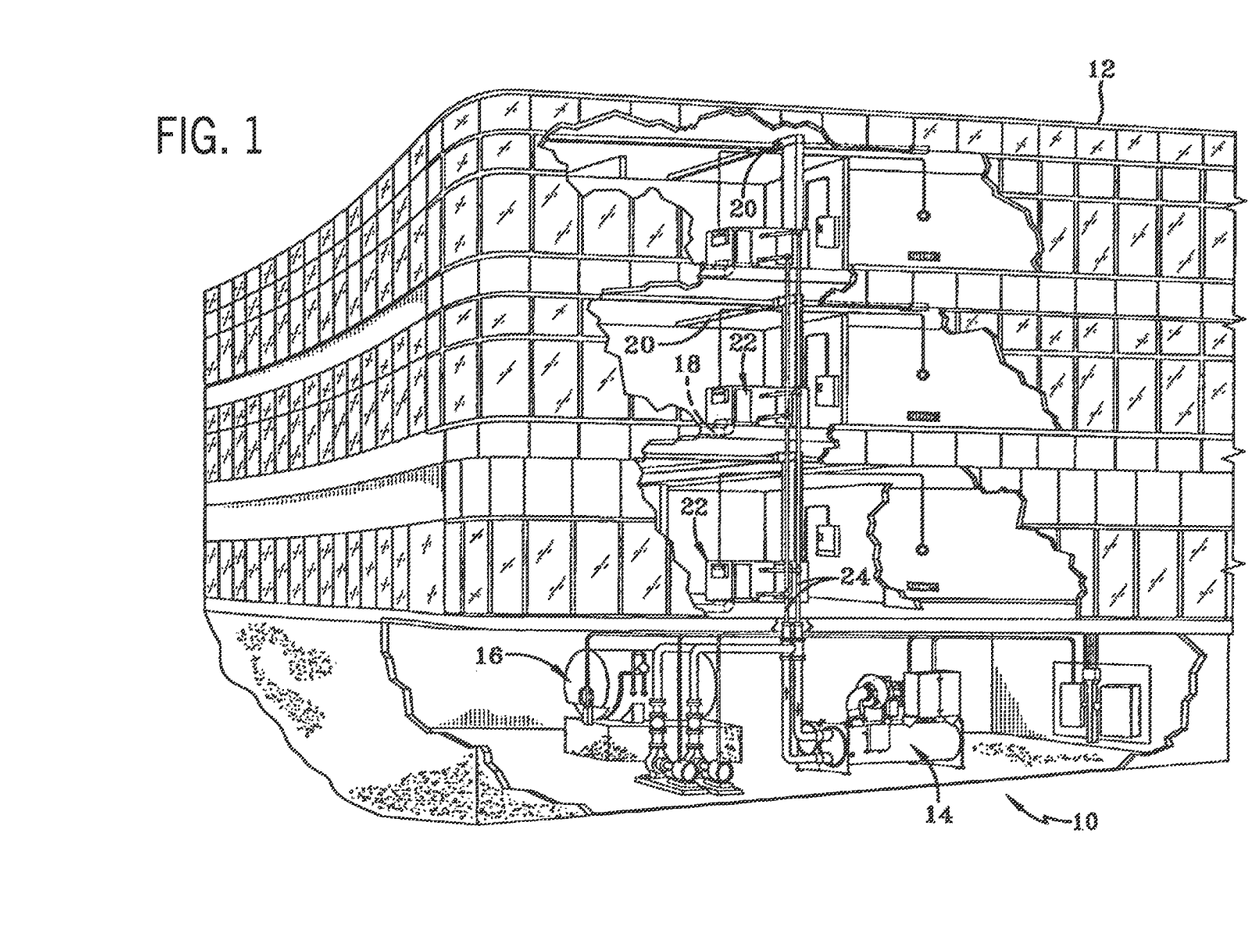
FIG. 1 is a perspective view of an embodiment of a building that may utilize a heating, ventilation, air conditioning, and refrigeration (HVAC&R) system in a commercial setting, in accordance with an aspect of the present disclosure.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
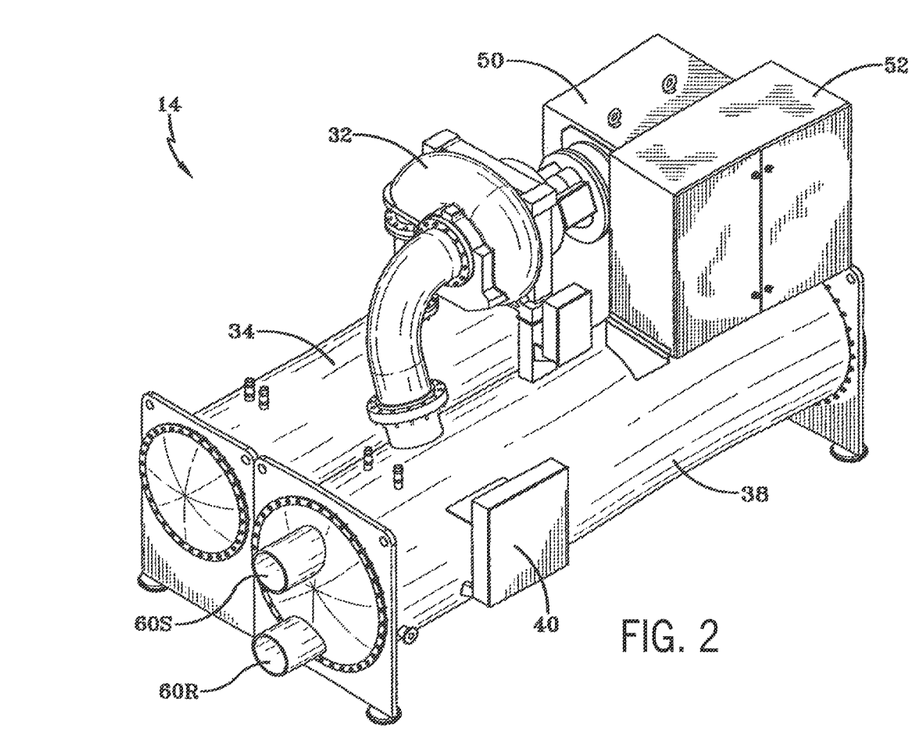
FIG. 2 is a perspective view of a vapor compression system, in accordance with an aspect of the present disclosure.
Figure 3:
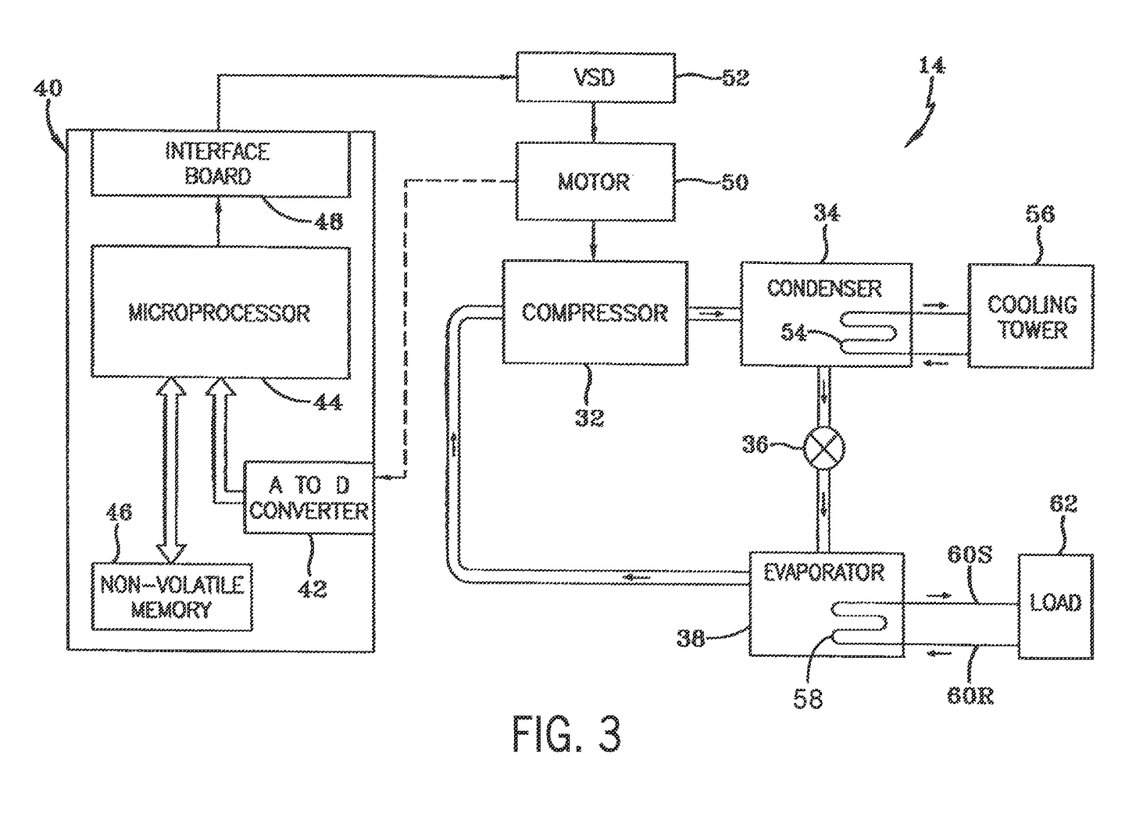
FIG. 3 is a schematic of an embodiment of the vapor compression system of FIG. 2, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia (NH3), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
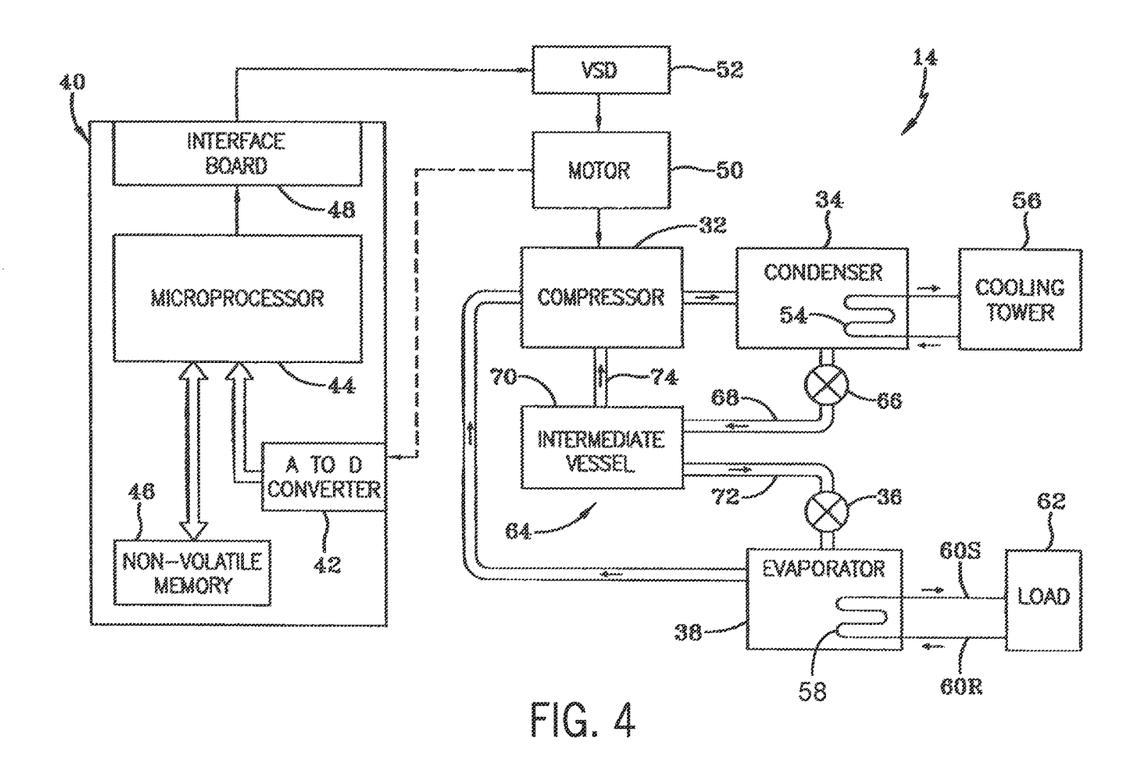
FIG. 4 is a schematic of an embodiment of the vapor compression system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

Typical heat exchangers of a heating, ventilation, air conditioning, and refrigeration (HVAC&R) system may receive refrigerant in a shell of the heat exchanger so that the refrigerant surrounds a tube bundle in the shell and is in thermal communication with a cooling fluid in the tube bundle. Unfortunately, the refrigerant that accumulates in the shell of the heat exchanger may include a pressure head that corresponds to a height of the refrigerant in the shell. As a result of the pressure head, a temperature of the refrigerant at a lower height of the shell may be several degrees (e.g., Fahrenheit) warmer than a temperature of refrigerant at a higher height of the shell. This phenomenon is sometimes referred to as the "submergence penalty," and it may adversely affect an efficiency of the system. Further, the submergence penalty may discourage the use of low pressure refrigerants because an increased amount of refrigerant may be disposed in the shell of the heat exchanger to operate at or near full cooling capacity. The effect of the submergence penalty may be more noticeable for larger capacity chillers that have correspondingly deeper tube bundles. For example, the saturation temperature of a refrigerant such as R-123 (having a normal boiling point at 1 atmosphere of 82 degrees Fahrenheit) increases by about 0.39 degrees Fahrenheit for every inch of liquid head. In a flooded tube bundle, an effective density of the refrigerant is reduced due to the presence of vapor, which may reduce the submergence penalty by almost fifty percent (e.g., the saturation temperature increases 0.20 degrees Fahrenheit per inch). Accordingly, for a 12 inch tall bundle, there may be a 2.4 degree Fahrenheit difference in saturation temperature between the refrigerant located at the top and bottom of the bundle. The submergence penalty is the average impact over the entire bundle, taking into consideration the average depth of tubes.

Figure 5:
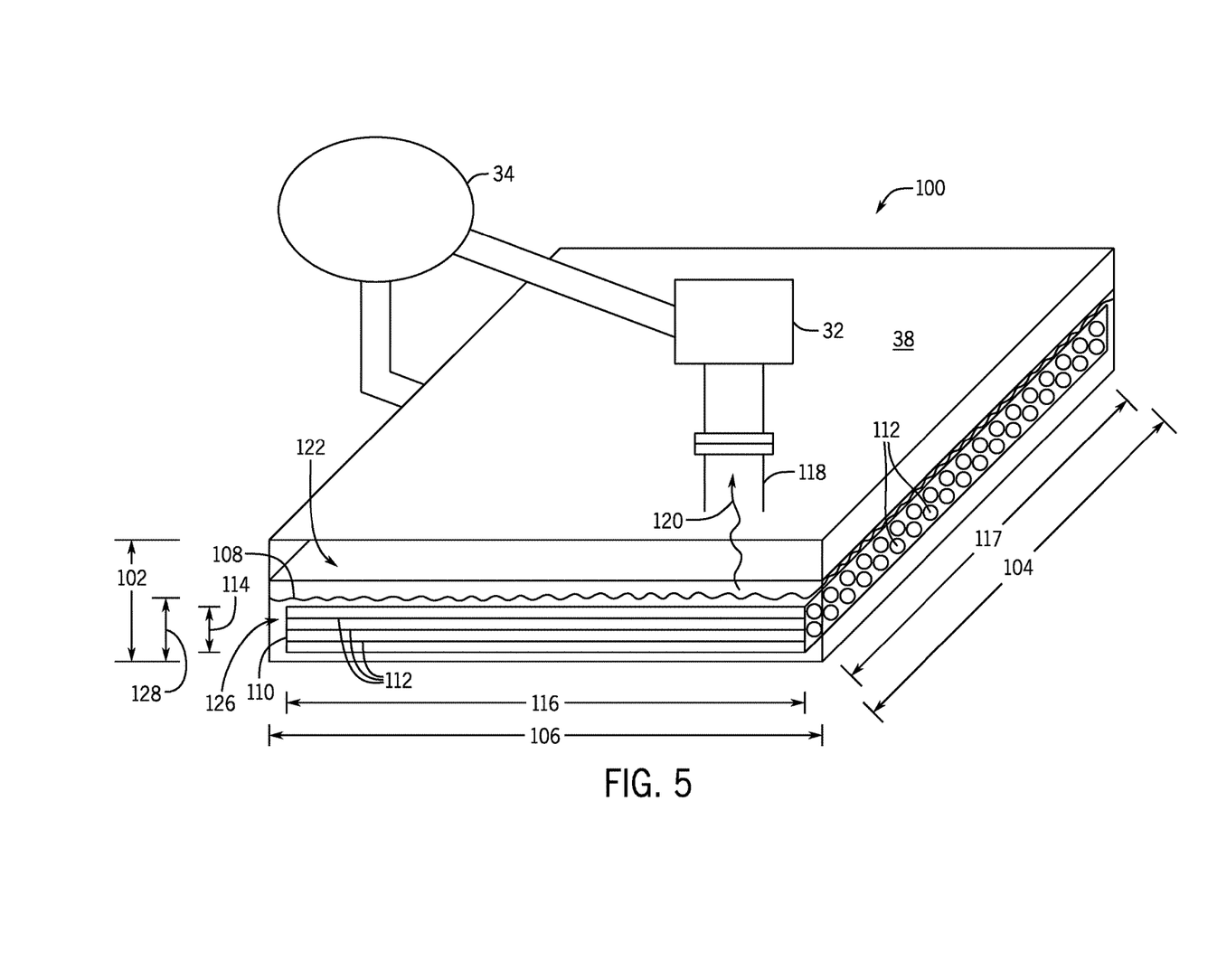
FIG. 5 is a schematic of a closed refrigerant loop configured to reduce a height of liquid refrigerant in an evaporator, in accordance with an aspect of the present disclosure.

To reduce the effect of the submergence penalty, the heat exchanger (e.g., the evaporator 38) may be configured to reduce a refrigerant level within the shell, such that the pressure head is reduced. For example, FIG. 5 is a schematic of an embodiment of a closed refrigerant loop 100 that may reduce a refrigerant level in the evaporator 38, and thus, reduce the pressure head that may lead to the submergence penalty. As shown in the illustrated embodiment, the evaporator 38 of the closed refrigerant loop 100 may include a height 102, a width 104, and a length 106. In other embodiments, the evaporator 38 may be substantially cylindrical, such that the height 102 and width 104 are replaced with a diameter. The width 104 and the length 106 of the evaporator 38 may be larger than traditional evaporators 38, such that the height 102 of the evaporator 38 may be reduced, and therefore, a refrigerant level in the evaporator 38 may be reduced.

For example, in some embodiments, the height 102 (or diameter) of the evaporator 38 may be between 5% and 90% of the length 106, between 10% and 75% of the length 106, between 15% and 60% of the length 106, between 25% and 50% of the length 106, or between 30% and 40% of the length 106. In other embodiments, the height 102 of the evaporator 38 may be between 5% and 100% of the width 104, between 10% and 75% of the width 104, between 25% and 75% of the width 104, between 30% and 60% of the width 104, or between 40% and 50% of the width. In still further embodiments, the height 102 of the evaporator 38 may be defined by a height of a typical evaporator that is configured to operate with substantially the same heating or cooling capacity. For example, the height 102 of the evaporator 38 may be between 5% and 75% of the height of a typical evaporator, between 10% and 60% of the height of a typical evaporator, between 15% and 55% of a typical evaporator, or between 25% and 40% of a typical evaporator. In other embodiments, the height 102 of the evaporator 38 may be based on a target heating or cooling capacity of the closed refrigerant loop 100. For example, the height 102 of the evaporator 102 may be determined based on an amount of refrigerant present in the evaporator 38 to achieve the target heating or cooling capacity. Accordingly, the height 102 of the evaporator 102 may be based on a target liquid level of the refrigerant in the evaporator 38 that achieves the target heating or cooling capacity and corresponds to a reduced pressure head of the refrigerant. In some embodiments, the height 102 of the evaporator 38 may be between 101% and 250% of the target liquid level of refrigerant in the evaporator 38, between 105% and 200% of the target liquid level of refrigerant in the evaporator 38, between 125% and 180% of the target liquid level of refrigerant in the evaporator 38, or between 150% and 175% of the target liquid level of refrigerant in the evaporator 38.

In any case, the reduced height 102 of the evaporator 38 may reduce a liquid level 108 of refrigerant in the evaporator. In some embodiments, a tube bundle 110 of the evaporator 38 may be reconfigured to accommodate the reduced height 102. For example, the tube bundle 110 may be reconfigured to include a more compact configuration (e.g., less distance between tubes 112 of the tube bundle 110). Additionally or alternatively, a height 114 of the tube bundle 110 may be reduced and a length 116 and/or width 117 of the tube bundle 110 may be increased to correspond to the reduction in the height 102 of the evaporator 38 and an increase in the width 104 and/or length 106 of the evaporator 38. In any case, the tubes 112 of the tube bundle 110 may be configured to flow a cooling fluid through the length 106 of the evaporator 38 in a single pass, in multiple passes, or a combination thereof. In embodiments of the evaporator 38 that include a multi-pass tube bundle, the evaporator 38 may further include one or more water boxes disposed at ends of the evaporator 38 to enable the cooling fluid to change directions and make multiple passes through the length 106 of the evaporator 38.

Additionally, the reduced height of the evaporator 38 may reduce a size of the closed refrigerant loop 100, which may facilitate packaging and/or reduce an overall footprint of the system. Further still, the closed refrigerant loop 100 of the present disclosure may be configured to reduce a pressure loss experienced by vapor refrigerant when moving from the evaporator 38 to the compressor 32 by removing a bend (e.g., an elbow, a turn, or another redirection of the refrigerant) between the evaporator 38 and the compressor 32. For example, the compressor 32 may be disposed vertically above a discharge 118 of the evaporator 38, such that vapor refrigerant 120 may simply rise from the discharge 118 directly into the compressor 32 without changing direction (e.g., in a bend or elbow) in a conduit between the evaporator 38 and the compressor 32. The vapor refrigerant 120 may experience swirl and/or another flow changing phenomenon that may lead to pressure loss within the bend or elbow between the evaporator 38 and the compressor 32. Therefore, removing such bend or elbow may reduce the pressure loss experienced by the vapor refrigerant 120 between the evaporator 38 and the compressor 32.

As shown in the illustrated embodiment of FIG. 5, the evaporator 38 includes the tube bundle 110 positioned beneath a mist eliminator 122. The mist eliminator 122 may be a perforated baffle or mesh plate that is disposed in the evaporator 38 to remove droplets of liquid refrigerant that may be entrained in the vapor refrigerant 120. It may be desirable to remove the droplets of liquid refrigerant from the vapor refrigerant 120 because such droplets may lead to a reduced efficiency of the system upon reaching the compressor 32. The tube bundle 110 may include a plurality of the tubes 112 configured to flow the cooling fluid, such that refrigerant 126 (e.g., liquid refrigerant) surrounding the tube bundle 110 is in thermal communication with the cooling fluid. The refrigerant 126 surrounding the tube bundle 110 may have a height 128 that is relatively low when compared to typical systems (e.g., because of the reduced height 102 of the evaporator 38). Accordingly, a pressure head of the refrigerant 126 in the evaporator 38 is reduced, and as a result, a low pressure refrigerant may be utilized in the closed refrigerant loop efficiently.

Figure 6:
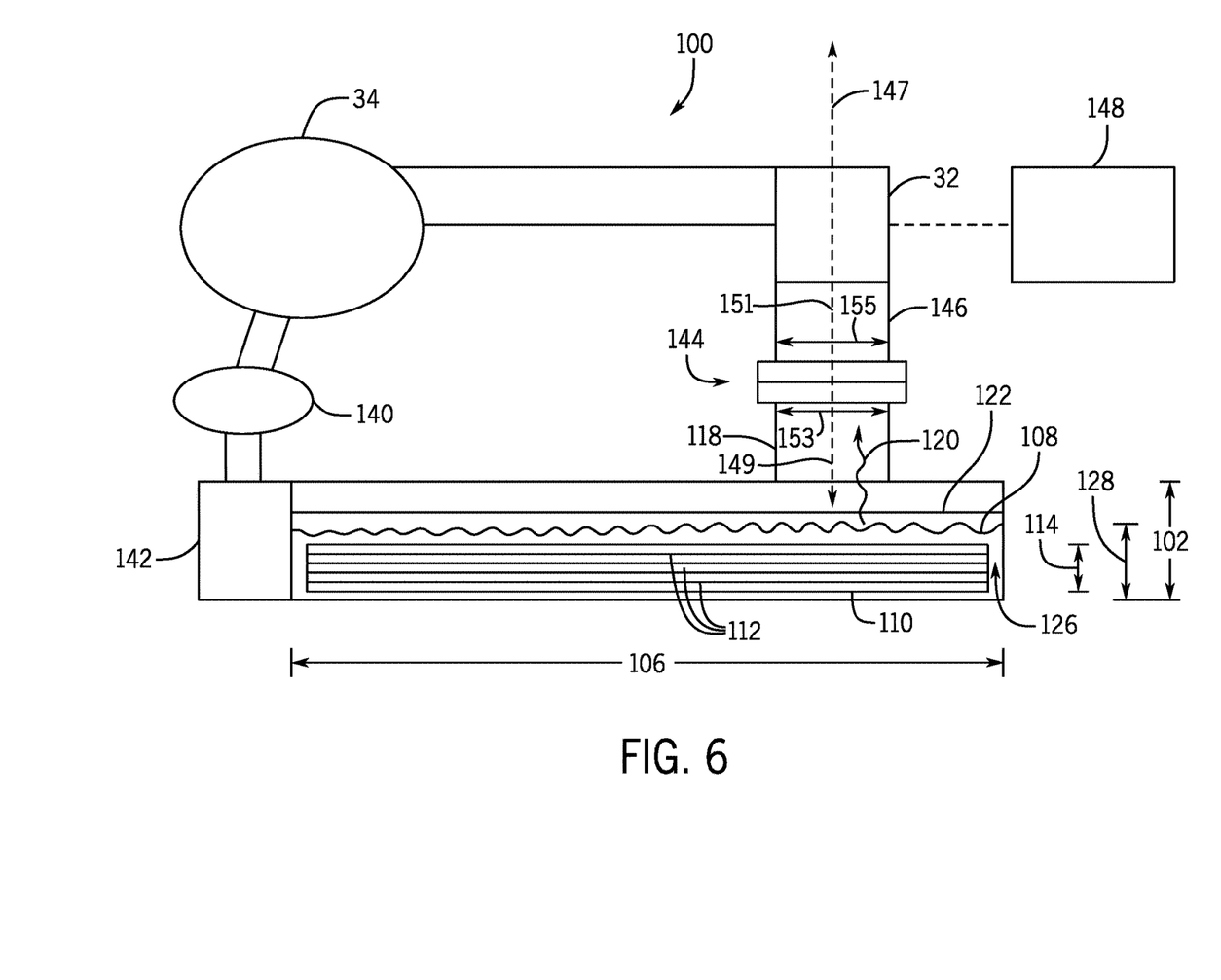
FIG. 6 is a schematic of the closed refrigerant loop of FIG. 5 having a subcooler and an economizer, in accordance with an aspect of the present disclosure.

FIG. 6 is a schematic of an embodiment of the closed refrigerant loop 100 having a subcooler 140 and an economizer 142 that may enhance an efficiency of the closed refrigerant loop 100 (e.g., by increasing an amount of thermal energy transfer between the condenser 34 and the evaporator 38). As shown in the illustrated embodiment of FIG. 6, the subcooler 140 and the economizer 142 may be disposed between the condenser 34 and the evaporator 38. Therefore, refrigerant exiting the condenser 34 may be further cooled in the subcooler 140 before being preheated in the economizer 142.

As further shown in FIG. 6, an interface 144 between the discharge 118 of the evaporator 38 and an inlet 146 (e.g., a suction side) of the compressor 32 is a direct, axial connection (e.g., a path of the vapor refrigerant 104 is substantially parallel to a vertical axis 147). For example, the discharge 118 and the inlet 146 may be substantially coaxial. As shown in the illustrated embodiment, a central axis 149 of the discharge 118 may be substantially parallel to, and vertically aligned with, a central axis 151 of the inlet 146. However, in other embodiments, the central axis 149 and the central axis 151 may be offset from one another. For example, the central axis 149 and the central axis 151 may be offset from one another between 0.5% and 1% of a width 153 of the discharge 118 and/or a width 155 of the inlet 146, between 1% and 5% of a width 153 of the discharge 118 and/or a width 155 of the inlet 146, or between 2% and 10% of a width 153 of the discharge 118 and/or a width 155 of the inlet 146. In still further embodiments, the central axis 149 and/or the central axis 151 may be offset from the vertical axis 147. For example, the central axis 149 and/or the central axis 151 may be offset from the vertical axis 147 by between 1 degree and 10 degrees, between 2 degrees and 5 degrees, or between 0.1 degrees and 1 degree.

Connecting the evaporator 38 and the compressor 32 with a conventional curved pipe may result in a pressure loss of the vapor refrigerant 120 between the evaporator and the compressor 32. Therefore, the interface 144 enables the vapor refrigerant 120 to rise vertically or substantially vertically from the evaporator 38, through the discharge 118, and into the inlet 146 of the compressor 32 without changing directions and/or incurring a pressure loss. In other words, the interface 144 may reduce swirl and enable the vapor refrigerant 120 to travel in substantially one direction (e.g., along the axis 147) between the evaporator 38 and the compressor 32. For example, more than 90% of the vapor refrigerant flows in a single, substantially vertical direction, more than 95% of the vapor refrigerant flows in a single, substantially vertical direction, more than 98% of the vapor refrigerant flows in a single, substantially vertical direction, or more than 99% of the vapor refrigerant flows in a single, substantially vertical direction. Additionally, the interface 144 may enable the inlet 146 of the compressor 32 to have a substantially uniform size. In typical systems, the compressor may have an inlet that reduces in size (e.g., volume) as the vapor refrigerant 120 approaches the compressor 32 in order to account for the pressure loss of the vapor refrigerant 120 experienced in a bend or elbow (e.g., reducing the size of the inlet may increase a pressure of the vapor refrigerant). Machining the substantially uniform inlet 146 may be less complex than machining an inlet that reduces in size, such that the interface 144 may reduce manufacturing costs of the system.

Further, the interface 144 may condense a size of the closed refrigerant loop 100 by reducing a distance that the vapor refrigerant 120 travels between the evaporator 38 and the condenser 34. Accordingly, a footprint of the closed refrigerant loop 100 may be reduced. In some embodiments, the interface 144 may enable the closed refrigerant loop 100 to include a hermetically sealed, in-line permanent magnet motor 148 to power the compressor 32 because of the reduced pressure drop achieved by the interface 144 (e.g., the hermetically sealed, in-line permanent magnet motor 148 may be efficient for powering compressors that achieve relatively low pressure differentials).

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, air conditioning, and refrigeration (HVAC&R) system comprising:
 a refrigerant loop;
 a compressor disposed along the refrigerant loop and configured to circulate refrigerant through the refrigerant loop, wherein the compressor comprises an inlet extending from an external surface of a housing of the compressor; and
 an evaporator disposed along the refrigerant loop and configured to place the refrigerant in thermal communication with a cooling fluid, wherein the refrigerant surrounds a tube bundle disposed in the evaporator, the tube bundle is configured to flow the cooling fluid, the evaporator comprises a discharge extending from an exterior surface of a shell of the evaporator, wherein the discharge is configured to direct the vapor refrigerant from the evaporator to the inlet of the compressor, and an interface between the discharge and the inlet, wherein the interface, the discharge, and the inlet are without a bend.

2. The HVAC&R system of claim 1, wherein a height of the evaporator is between 10% and 50% of a length of the evaporator, and wherein the height of the evaporator is between 10% and 50% of a width of the evaporator.

3. The HVAC&R system of claim 2, comprising the tube bundle of the evaporator, wherein the tube bundle is configured to direct the cooling fluid through multiple passes of the length of the evaporator.

4. The HVAC&R system of claim 1, wherein the discharge and the inlet are coaxial with one another.

5. The HVAC&R system of claim 1, wherein the evaporator comprises an economizer configured to receive and preheat the refrigerant before the refrigerant surrounds the tube bundle.

6. The HVAC&R system of claim 1, wherein the interface comprises a flanged connection between the discharge and the inlet.

7. A heating, ventilation, air conditioning, and refrigeration (HVAC&R) system, comprising:
  a refrigerant loop;
  a compressor disposed along the refrigerant loop and configured to circulate refrigerant through the refrigerant loop, wherein the compressor comprises an inlet extending from an external surface of a housing of the compressor; and
  an evaporator disposed along the refrigerant loop and configured to place the refrigerant in thermal communication with a cooling fluid to evaporate the refrigerant into vapor refrigerant, wherein the evaporator comprises a discharge extending from an exterior surface of a shell of the evaporator, wherein the discharge is configured to direct the vapor refrigerant from the evaporator to the inlet of the compressor, wherein the evaporator comprises an interface between the discharge and the inlet, wherein the interface, the discharge, and the inlet are without a bend, and wherein a first central axis of the discharge and a second central axis of the inlet are axially aligned such that the vapor refrigerant travels in one direction from the evaporator to the compressor.

8. The HVAC&R system of claim 7, wherein the compressor is driven by a hermetically sealed, in-line permanent magnet motor.

9. The HVAC&R system of claim 7, wherein the refrigerant is a low pressure refrigerant.

10. The HVAC&R system of claim 9, wherein the low pressure refrigerant is R-123.

11. The HVAC&R system of claim 7, comprising a condenser configured to receive the vapor refrigerant from the compressor and condense the vapor refrigerant to the refrigerant.

12. The HVAC&R system of claim 11, comprising a subcooler and an economizer disposed between the condenser and the evaporator, wherein the subcooler is configured to subcool the refrigerant exiting the condenser, and wherein the economizer is configured to preheat the refrigerant before the refrigerant is placed in thermal communication with the cooling fluid in the evaporator.

13. The HVAC&R system of claim 7, wherein a height of the evaporator is between 10% and 50% of a length of the evaporator, and wherein the height of the evaporator is between 10% and 50% of a width of the evaporator.

14. The HVAC&R system of claim 7, wherein the evaporator comprises a box shape.

15. The HVAC&R system of claim 7, wherein the interface comprises a flanged connection between the discharge and the inlet.

16. A heating, ventilation, air conditioning, and refrigeration (HVAC&R) system, comprising:
  a refrigerant loop;
  a compressor disposed along the refrigerant loop and configured to circulate refrigerant through the refrigerant loop, wherein the compressor comprises an inlet extending from an external surface of a housing of the compressor; and
  an evaporator disposed along the refrigerant loop and configured to place the refrigerant in thermal communication with a cooling fluid to evaporate the refrigerant to a vapor refrigerant, wherein the refrigerant surrounds a tube bundle disposed in the evaporator, the tube bundle is configured to flow the cooling fluid, the evaporator comprises a discharge extending from an exterior surface of a shell of the evaporator, wherein the discharge is configured to direct the vapor refrigerant from the evaporator to the inlet of the compressor, wherein the discharge, the inlet, and an interface between the discharge and the inlet are without a bend, and the discharge and the inlet are coaxially aligned such that the vapor refrigerant travels in a vertical direction from the evaporator to the compressor.

17. The HVAC&R system of claim 16, wherein the inlet of the compressor is configured to have a uniform size.

18. The HVAC&R system of claim 16, wherein a height of the evaporator is between 10% and 50% of a length of the evaporator, and wherein the height of the evaporator is between 10% and 50% of a width of the evaporator.

19. The HVAC&R system of claim 16, wherein the evaporator comprises a box shape.

20. The HVAC&R system of claim 16, wherein the interface comprises a flanged connection between the discharge and the inlet.

* * * * *